United States Patent [19]

Sawada et al.

[11] Patent Number: 4,626,941
[45] Date of Patent: Dec. 2, 1986

[54] METHOD AND APPARATUS FOR SUPPRESSING THE EVAPORATION OF LUBRICANT FILM COATED ON MAGNETIC DISKS OF A DISK STORAGE

[75] Inventors: Shigetomo Sawada, Yokohama; Takeo Hinobayashi, Sagamihara, both of Japan

[73] Assignee: Fujitsu Limited, Kawasaki, Japan

[21] Appl. No.: 618,078

[22] Filed: May 22, 1984

[30] Foreign Application Priority Data

| May 26, 1983 | [JP] | Japan | 58-93557 |
| May 26, 1983 | [JP] | Japan | 58-93558 |
| May 30, 1983 | [JP] | Japan | 58-96688 |
| Jun. 30, 1983 | [JP] | Japan | 58-120097 |
| Jun. 30, 1983 | [JP] | Japan | 58-120098 |

[51] Int. Cl.$^4$ .................. G11B 5/012; G11B 17/32; G11B 5/82
[52] U.S. Cl. .................. 360/97; 360/98; 360/103; 360/135
[58] Field of Search .................. 360/97–99, 360/102–103, 133, 135

[56] References Cited

U.S. PATENT DOCUMENTS

| 4,185,308 | 1/1980 | Fujioka | 360/97 |
| 4,223,361 | 9/1980 | Zaitsu et al. | 360/133 |
| 4,315,288 | 2/1982 | Bernett et al. | 360/98 |
| 4,363,057 | 12/1982 | Siverling et al. | 360/98 |
| 4,367,502 | 1/1983 | Iftikar et al. | 360/98 |
| 4,419,164 | 12/1983 | Martinelli | 360/133 X |

FOREIGN PATENT DOCUMENTS

| 2106392 | 8/1971 | Fed. Rep. of Germany | 360/102 |
| 57-98164 | 6/1982 | Japan | 360/97 |
| 58-1869 | 1/1983 | Japan | 360/98 |

OTHER PUBLICATIONS

Eisenmann, "Disc File with Built-In Ionizer," IBM Tech. Disc. Bull., vol. 25, No. 7A, Dec. 1982.

Primary Examiner—Stuart N. Hecker
Assistant Examiner—Benjamin E. Urcia
Attorney, Agent, or Firm—Staas & Halsey

[57] ABSTRACT

A magnetic disk storage apparatus includes an air-tight enclosure containing a drive mechanism for rotating magnetic disks coated with a lubricant material and a flying head assembly. A lubricant evaporating source is arranged inside the enclosure and exposed to the flow of hot air produced by rotation of the disks whereby the lubricant is evaporated and the enclosure is filled with lubricant vapor to suppress the evaporation and consumption of the lubricant layers coated on the magnetic disks. The lubricant evaporating source may be positioned on the inside wall of the enclosure, on a dummy surface of the disks, or on a portion exposed to the circulating hot air flow inside the enclosure. The surface on which the lubricant evaporating source is coated may be of a porous or rough structure to accelerate the evaporation of the lubricant of the source and provide a strong adhesion of the lubricant material to the surface.

15 Claims, 7 Drawing Figures

METHOD AND APPARATUS FOR SUPPRESSING THE EVAPORATION OF LUBRICANT FILM COATED ON MAGNETIC DISKS OF A DISK STORAGE

BACKGROUND OF THE INVENTION

The present invention relates to a magnetic disk storage apparatus using a magnetic disk coated with a lubricant film to protect the disk from friction damage. More particularly, the present invention relates to an apparatus and method for suppressing the evaporation of the lubricant film in order to maintain a stabilized lubricant film on the disk during periods of long operating duration.

A large capacity magnetic disk storage with a high real density provides the main file for information processing systems. Recently, an air-tight, dust-free enclosure for the magnetic disk driving assembly of such a system generally has been used in order to achieve highly reliable and maintenance-free operation. Usually the magnetic disk driving assembly has a flying head. Before starting, the flying head rests on the surface of the disks. During start-up of the rotation of the disks, and during the landing of the flying head onto the disk surfaces, there exists sliding friction between the flying head and the surface of the disks. Such operation of the disk device is called a "contact start stop" or CSS system.

In order to obtain a higher recording density on the disks, a very thin recording medium film is formed by vacuum sputtering or plating technology on the magnetic disks. Therefore, to protect the thin film of recording medium from wearing by sliding friction and also to reduce the wear of the magnetic heads, a lubricant is necessary for the magnetic disks.

Usually, the lubricant is formed as a film on the surface of the disks. Solid or liquid material having excellent lubricating qualities, such as higher fatty acids, esters of higher fatty acid, higher alcohols, ether compounds, fluorides thereof and the like, are used for the lubricant material.

In a magnetic disk driving assembly with an air-tight enclosure, the temperature normally rises up to around 60° to 70° C. The heat is generated inside the enclosure due to the "windage loss" being generated by the friction loss of the air layer adjacent the rotating magnetic disks. The disks rotate at a speed of 3000 to 6000 revolutions per minute. As a result, the temperature of the disks is higher than that of the surrounding environment. This higher temperature accelerates the evaporation of the lubricant film formed on the disks.

In addition, lower flying height of the magnetic head; namely, small spacing between the magnetic medium and the magnetic head slider, is required to enhance recording density. For higher recording density of 40,000BPI to 50,000BPI, the thickness of the lubricant film on the magnetic disk is required to be as small as 100 Å. Such a thin lubricant film is exhausted by evaporation in a relatively short operating period of time at the high temperatures described above. As a result, the stored information in the disks is often damaged due to the friction between the head slider and the magnetic medium. Furthermore, the wear durability of the head slider is unsatisfactory. Thus, the reliability and maintainability of such prior art storage devices has been unsatisfactory.

SUMMARY OF THE INVENTION

It is an object of the present invention to provide a maintenance-free and reliable magnetic disk storage.

Another object of the present invention is to provide a magnetic disk storage having a lubricant evaporating source arranged inside an air-tight enclosure for a disk driving assembly to suppress the consumption of a lubricant film on a magnetic disk and to keep the lubricant film well stabilized during operation.

Still another object of the present invention is to provide a method for suppressing the consumption of a lubricant layer formed on a magnetic storage disk inside of an air-tight enclosure of a magnetic disk storage apparatus by evaporating a lubricant material from a lubricant evaporating source inside the enclosure during operation of the apparatus.

For a magnetic disk storage with high memory capacity, the lubricant film formed on the magnetic disk plays an important roll to prevent the magnetic head slider from wearing. In order to keep the lubricant film formed on magnetic disks more stable during operation, the present invention functions to suppress the evaporation of the lubricant film by filling up the inside space of the air-tight enclosure of the magnetic disk storage with lubricant vapor. If the space inside the enclosure is filled up with a lubricant vapor, the evaporation of the lubricant from the lubricant film will be significantly suppressed and the life of the lubricant film on the disk will be prolonged. The higher the vapor pressure, the higher the suppressing effect.

In carrying out the present invention, a lubricant evaporating source is arranged inside an air-tight enclosure of a magnetic disk storage and the lubricant vapor supplied continuously from the source. The evaporation rate of the lubricant increases exponentially with the temperature and is also enhanced by turbulent hot air flow striking the evaporating surface. Lubricant sources of various types may be used in the present invention.

As described above, in order to provide enough quantity of the lubricant vapor to suppress the evaporation of the lubricant film on the disk, the temperature of the lubricant evaporating source should be as high as possible. Also the total effective area of the evaporating surface of the source should be as large as possible. The evaporation rate may be increased by exposing the evaporating surface of the source to the circulating hot air flow induced by the rotation of the magnetic disks.

The material of the lubricant film on the disk also may be composed of lubricant materials of two or more kinds. In such a case, the lubricant having the highest evaporating rate should be selected as the material of the lubricant evaporating source.

The present invention will become more apparent from the description of preferred embodiments set forth below with reference to the accompanying drawings.

BRIEF DESCRIPTION OF THE DRAWINGS

FIGS. 4 (a), (b), (c) and (d) are enlarged partial cross-sectional views of lubricant evaporating sources formed by different methods;

Throughout the drawings, like reference numbers denote like parts of the apparatus.

DESCRIPTION OF THE PREFERRED EMBODIMENTS

Figure 1:
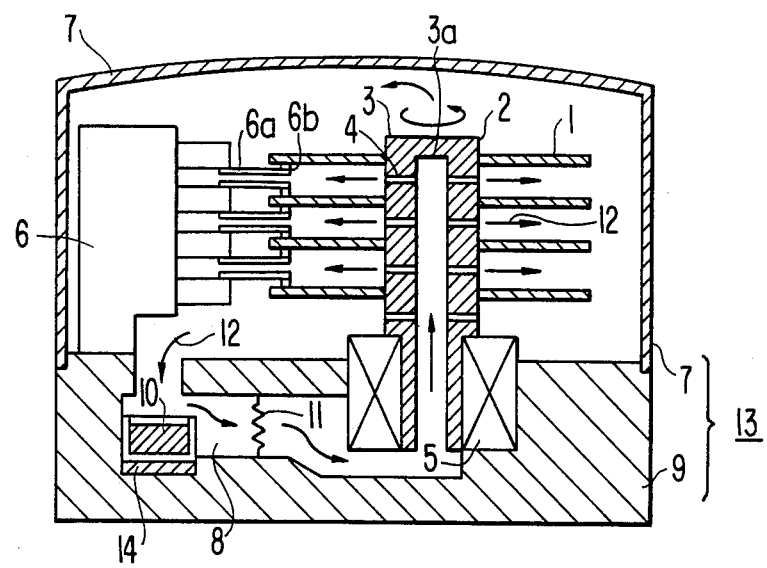
FIG. 1 is a cross-sectional elevation view of a magnetic storage according to the present invention, having a lubricant evaporating source in the path of circulating hot air flow.

A cross-sectional elevation view of a magnetic disk storage according to the present invention is illustrated in FIG. 1. Magnetic disks 1 are coated with films of a lubricant material such as myristic acid, a kind of higher fatty acid, having a thickness of 70 Å. A plurality of magnetic disks 1 are held in parallel with a fixed spacing between them by hub means 2 which is attached to a spindle 3 of a rotating mechanism 5 positioned on a base structure 9. The spindle 3 has a hollow cylindrical space 3a at its center axis and a plurality of side holes 4 formed radially in a plane horizontal to the center axis of the spindle 3 for each disk. A side hole 4 is provided every 60 degrees around the periphery of the hub for a total of six holes associated with each disk. The side holes 4 are connected to the hollow cylinder space 3a and open at the outer surface of the spindle 3. A hollow path 8 is provided in base structure 9. The hollow cylinder space 3a, side holes 4 and the hollow path 8 comprise a circulating path for hot air flow 12 produced by the rapid rotation of the disks 1, to cool the hot air by circulating. A filter 11 is positioned in the path of the hot air flow to filter dust particles. Four head assemblies 6a, each of them having two flying heads 6b, are mounted on an actuator 6, which positions each flying head precisely and quickly. All the apparatus described above are covered by an air-tight container 7 mounted on base structure 9 to form an enclosure 13 for the head disk assembly.

According to the present invention, a lubricant evaporating source is mounted inside the enclosure 13 to fill up the inside of the enclosure with lubricant vapor having sufficient vapor pressure to suppress the evaporation of the lubricant films on the magnetic disks 1. The lubricant evaporation source (hereafter referred to as "source") may have several embodiments as described hereafter.

In the embodiment shown in FIG. 1, the source 10 is positioned in the path of a hot air circulating flow indicated by arrows 12. The evaporation of the lubricant material from the surface of the source is substantially increased by the turbulent flow of hot air striking the surface. The lubricant material is coated or simply placed on a surface of a base plate of a dish-shaped or box-shaped lubricant container. Alternatively, the lubricant material to be evaporated may be impregnated into a porous surface such as a sintered glass powder plate or embedded in small pits formed on the base plate. At a thermally steady operating state, the temperature inside the enclosure 13 comes up to 60° to 70° C., but the temperature of the disk 1 itself is usually higher. A heating means 14 such as electric heater may be positioned adjacent the source to heat up the source, thus creating a higher vapor pressure of the lubricant inside the enclosure 13. The higher vapor pressure results in a more effective suppression of the evaporation of the lubricant from the surface of the disks. A temperature controller with a thermo-sensor may be utilized with the heater to control the temperature of the lubricant evaporating source.

Figure 2:
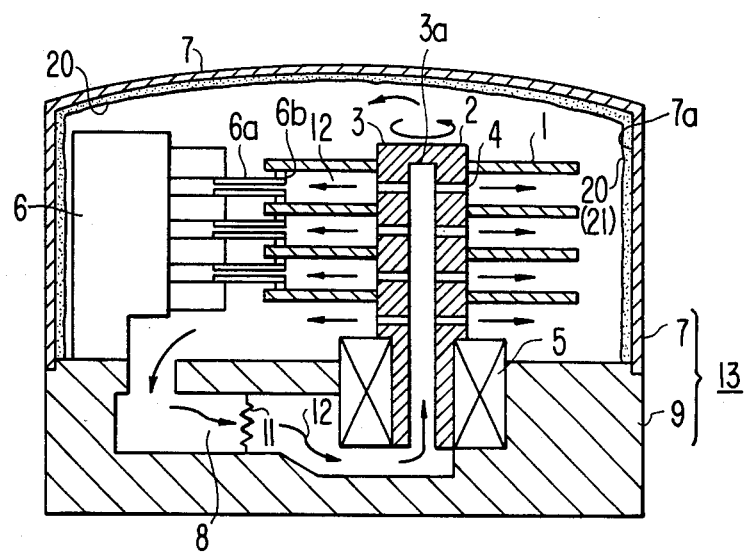
FIG. 2 is a cross-sectional elevation view of a magnetic storage according to the present invention, having a lubricant evaporating source located on the surface of the inner wall of the air-tight container.

In the embodiment shown in FIG. 2, a source 20 is located on the inside wall 7a of the air-tight container 7, thus creating a large evaporating surface area. The temperature inside the enclosure during steady operation usually rises to 60° to 70° C. Furthermore, in order to increase the effective evaporating area, a rough surface may be formed on the inside wall 7a by any suitable method such as sand blasting, machining and the like. A porous surface also may be formed on the inside wall 7a for this purpose. The porous surface may be obtained by sintering metal powders, glass powders and the like on the inside wall 7a as will be described later.

When a porous layer 21 is formed on inside wall 7a as an evaporating surface of the lubricant of the source 20, the porous layer serves also as a container for the lubricant to be evaporated. The lubricant may be impregnated into the porous layer 21 by an immersing or depositing method or the like. A better adherence of the lubricant is obtained in a porous layer as compared to a layer formed by deposition or coating of the lubricant film.

For accelerating the evaporation of the lubricant stored in the source, it also is effective to locate a lubricant source on a disk or a plane which rotates together with the magnetic disks 1. The rotating surface is heated by the windage loss induced by the friction of the air layer and the rapidly rotating evaporating surface. Heating of the surface accelerates the evaporation of the lubricant formed thereon.

Figure 3:
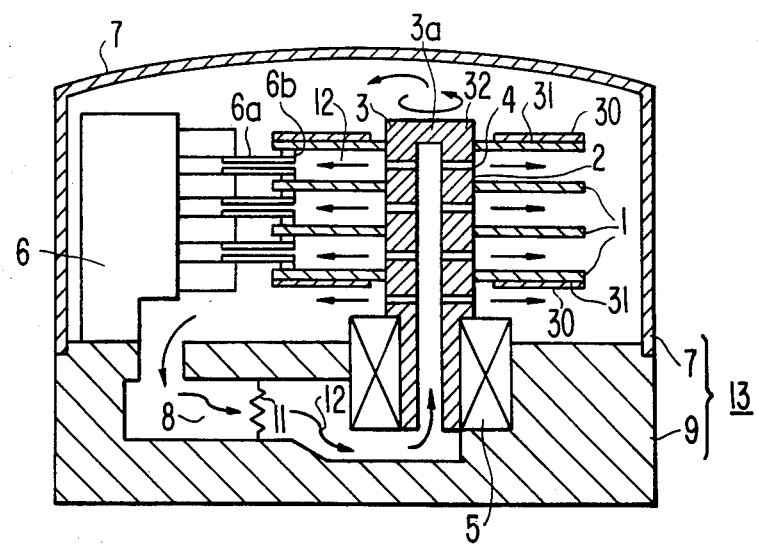
FIG. 3 is a cross-sectional elevation view of a magnetic storage according to the present invention, having a lubricant evaporating source located on dummy surfaces of the magnetic disks.

As shown in the embodiment of FIG. 3, dummy disk surfaces 31 are usually provided in a magnetic disk storage. They are usually the top and bottom surfaces of the uppermost and lowermost disks 1 on the hub means 2, and are not used for recording because of unstable movement of the flying heads. The lubricant evaporating source 30 may be formed on the dummy disk surfaces 31. The source 30 also may be located on other rotating surfaces such as a portion of the surface 32 of the hub means 2, or on a special rotating plane or disk attached to the rotating hub means 2 or the spindle 3 directly.

Unlike the lubricant film formed on the surfaces of the magnetic disks used for recording, the thickness of the lubricant layer of the source is not limited because the source is not used for high density recording. Thus, the source can provide a sufficient quantity of the lubricant to suppress the exhausting of the lubricant film on the magnetic disks 1 for operating periods of long duration.

Figure 4A:
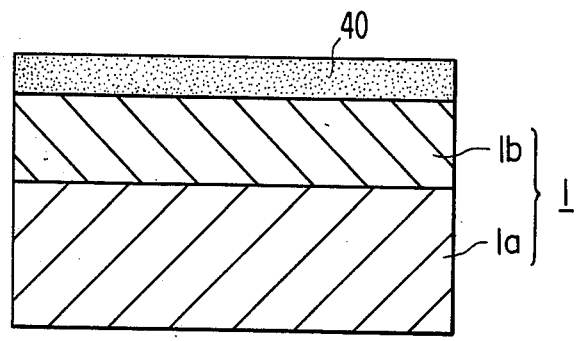
FIG. 4(a) illustrates the structure of a lubricant evaporating source wherein the lubricant is formed as a film on a dummy disk surface of a magnetic disk.

FIGS. 4(a)–4(d) show enlarged cross-sectional views of lubricant evaporating sources formed by different methods. In FIG. 4(a), the lubricant evaporating surface is formed on a dummy disk surface of a magnetic disk 1. The magnetic disk comprises a disk core 1a and a recording medium 1b. A layer of lubricant material 40 may be formed on the surface of the recording medium by spin coating, vaporizing, spraying method or the like.

According to other embodiments of the invention described hereafter, structures are provided wherein the lubricant material has good adhesion to the surface on which it is formed. Strong adhesion of the lubricant material to the surface on which it is formed is particularly important when the lubricant is formed on a rotating surface such as a disk, in view of the high speeds of rotation employed. Still other embodiments are provided having large effective evaporating surface areas.

Figure 4B:
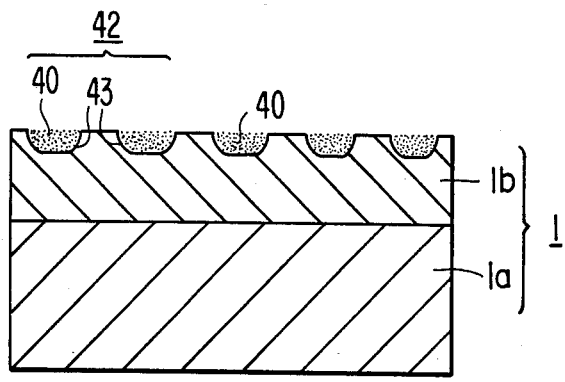
FIG. 4(b) illustrates the structure of a lubricant evaporating source wherein the lubricant is formed on a base having a surface with shallow pits.

In FIG. 4(b), a magnetic medium layer 1b is formed on a disk plate core 1a. A large number of shallow pits 43 having approximately a 30 um diameter and a 2 um depth are formed on the magnetic medium layer 1b by conventional lithographic technology. The density may be approximately 2000 pits/cm². Myristic acid 40 may be packed into the pits 43 forming a lubricant layer 42 having a strong adhesion to the base plate or layer 1b.

Figure 4C:
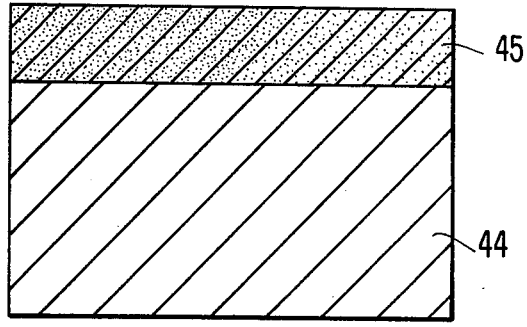
FIG. 4(c) illustrates the structure of a lubricant evaporating source wherein the lubricant is impregnated in a porous surface.

In FIG. 4(c), a porous surface is formed on a base plate 44. Several different methods may be employed to form the porous surface. A porous glass layer 45, shown in the figure, may be formed by coating a glass resin such as No. 150 glass resin manufactured by the Owens Illinois Co., on the base plate and baking it in a furnace. The lubricant material then can easily be impregnated into the porous glass layer 45. For example, myristic acid diluted by xylene is easily absorbed into the pores in layer 45, and by evaporating the xylene, myristic acid of 0.13 mg/100 cm² (this corresponds to a thickness of around 150 Å), is impregnated into the porous layer 45. The porous structure provides the lubricant material with a large evaporating area as well as strong adhesion to the layer.

Instead of the glass resin, other suitable powder materials such as metal powder or plastic powder may be utilized to form a sintered porous layer for this purpose. In addition, other porous materials such as plastic sponges may be utilized as a porous layer impregnated with the lubricant of the source.

Figure 4D:
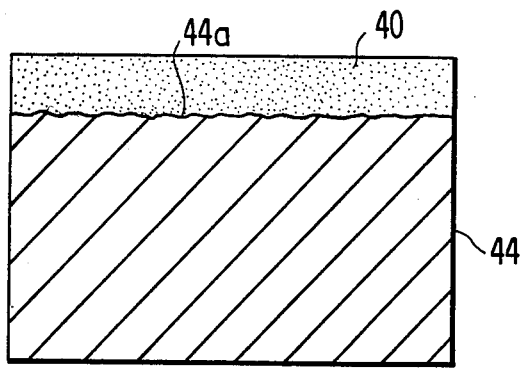
FIG. 4(d) illustrates the structure of a lubricant evaporating source wherein the lubricant is formed on a base plate having a roughened surface.

In FIG. 4(d), still another structure of the lubricant evaporating source is illustrated. The base plate 44 is provided with a rough surface 44a formed by sand blasting, machining or other suitable methods. The roughened surface insures strong adhesion of the lubricating material to the surface on which it is formed.

In the embodiments described so far, the lubricant material coated on the magnetic disks is comprised of a single material and the same lubricant material is used for the lubricant material of the lubricant evaporating source. In another embodiment of the present invention, however, the lubricant layers on the magnetic disks may be comprised of two or more layers of different lubricants, or contain a mixture of two or more different lubricants.

As previously described, lubricants of various types are usable. One group of such lubricants includes several higher fatty acids such as myristic acid, stearic acid and behenic acid and an ester of higher fatty acids such as myristin, stearin, etc. These are volatile lubricants having excellent lubricating capabilities but a higher rate of evaporation. Another group of suitable lubricants includes higher fatty acids such as cerotic acid, montanic acid, etc. and silicon oils which have higher thermal stability but lower lubricating capability. A lubricant layer obtained by laminating or mixing these lubricants belonging to two groups is stable at a higher temperature such as 60° to 70° C. and also has high lubricating capability. When a laminated or mixed lubricant is coated on the magnetic disks, the lubricant having the highest evaporating rate at the operating temperature should be used as the material of the lubricant evaporating source.

In the embodiments described above, the lubricant vapor may deposit on surfaces inside the air-tight container other than that of the magnetic disks, such as the surface of the hubs, magnetic heads and the like. The quantity deposited is so small, however, that no trouble occurs and does not interfere with the normal operation of the apparatus. For example, assuming that myristic acid is used as the lubricant, its saturated vapor pressure at 70° C. is estimated to be $1 \times 10^{-4}$ mmHg. This means a space of 1000 CC contains 0.0013 mg of myristic acid. Also on the inside surface of the enclosure of 100 cm², myristic acid of 0.019 mg is absorbed. Such a small quantity of lubricant does not affect the function of the magnetic disk storage apparatus.

The following examples illustrate the effectiveness of certain embodiments of the present invention.

EXAMPLE I

A magnetic disk storage such as that shown in FIG. 3 was employed wherein a dummy magnetic disk surface was coated with a porous glass layer impregnated by a lubricant material to be used as the lubricant source.

In each instance, the same lubricant material was used for the evaporating source as that used for the lubricant layer on the magnetic disks. The lubricant material used was selected from myristic acid, behenic acid and stearin. Three devices (denoted by A, B and C) according to the present invention and one prior art device (denoted by D), i.e., one having no lubricant evaporating source inside its enclosure, were run at the same time. The coefficients of friction between the magnetic heads and the magnetic disks being tested were measured before and after the test by a modified testing method according to ISO-DIS 7298. During the running of the storage device, the starting up and landing of the flying magnetic heads were conducted every 4 to 8 hours to observe the lubricating conditions. The disk temperature was approximately 70° C., the same as that encountered during normal operation.

The results of the testing are summarized in Table 1. In the Table, the lubricants used, that is, myristic acid, behenic acid and stearin, are numbered respectively as 1, 2, and 3. The three devices according to the present invention are designated as units A, B, and C while the prior art device is designated as unit D.

TABLE 1

| lubricant | experiment number | operating time (Hr.) | coefficient of friction | |
|---|---|---|---|---|
| | | | before test | after test |
| myristic acid | A-1 | 160 | 0.22 | 0.21 |
| | B-1 | 160 | 0.22 | 0.22 |
| | C-1 | 160 | 0.22 | 0.22 |
| | D-1 | 8 | 0.22 | >0.4 |
| behenic acid | A-2 | 165 | 0.25 | 0.26 |
| | B-2 | 160 | 0.25 | 0.26 |
| | C-2 | 160 | 0.25 | 0.27 |
| | D-2 | 12 | 0.25 | >0.4 |
| stearin | A-3 | 160 | 0.18 | 0.20 |
| | B-3 | 160 | 0.18 | 0.19 |
| | C-3 | 160 | 0.18 | 0.18 |
| | D-3 | 8 | 0.18 | >0.4 |

The coefficient of friction for the prior art device tested increased rapidly up to higher than 0.4 after only 8 hours of testing. With respect to the devices according to the present invention, however, the coefficients of friction showed little difference between the starting point and the ending point of the test (160 hours). This was true for all three types of lubricant material used.

EXAMPLE II

A magnetic disk storage, such as that shown in FIG. 2, was employed wherein the inner wall of the air-tight container was utilized as a base plate for the lubricant source. A glass porous layer was formed on the wall, and the lubricant material was impregnated into the layer. The testing was conducted in the same manner as that previously described with respect to Example I, and the results obtained are summarized in Table 2. In Table 2, the device according to the present invention is designated as unit E while the prior art unit with no lubricant evaporating source is denoted by D as before. The lubricant employed was myristin, as ester of myristic acid, which is denoted by the numeral 4.

TABLE 2

| lubricant | experiment number | operating time (Hr.) | coefficient of friction before test | coefficient of friction after test |
|---|---|---|---|---|
| myristic acid | E-1 | 100 | 0.22 | 0.21 |
|  | D-1 | 8 | 0.22 | >0.4 |
| stearin | E-3 | 90 | 0.18 | 0.19 |
|  | D-3 | 8 | 0.18 | >0.4 |
| myristin | E-4 | 100 | 0.16 | 0.16 |
|  | D-4 | 8 | 0.16 | >0.4 |

The results tabulated in Table 1 and Table 2 demonstrate that a lubricant evaporating source is effective to stabilize the lubricant layers formed on the magnetic disks and that the present invention provides a highly reliable magnetic disk storage. Similar results were obtained by the inventors with a magnetic disk storage such as that shown in FIG. 1.

It is clear from the above description of the preferred embodiments that the method and apparatus of the present invention can provide an effective means to suppress the evaporation and consumption of lubricant layers coated on magnetic disks in a magnetic disk storage apparatus during long periods of operation of the device.

The many features and advantages of the invention are apparent from the detailed specification and thus, it is intended by the accompanying claims to cover all such features and advantages of the system which fall within the true spirit and scope of the invention. Further, since numerous modifications and changes will readily occur to those skilled in the art, it is not desired to limit the invention to the exact instruction and operation shown and described, and accordingly, all suitable modifications and equivalents may be resorted to falling within the scope of the invention.

We claim:

1. A magnetic disk storage apparatus comprising:
   an air-tight enclosure having a base and a container;
   a magnetic storage disk coated with a lubricant layer;
   drive means for rotating said disk;
   a flying head assembly; and
   a lubricant evaporating source containing a lubricant material positioned selectively inside said enclosure so that the evaporating surface of said lubricant evaporating source is exposed to the hot air flow created by the rotation of said disk such that the evaporation of said lubricant material contained in said lubricant evaporating source is accelerated;
   said lubricant evaporating source during operation of said magnetic disk storage apparatus providing a lubricant vapor inside of said enclosure which suppresses the consumption of said lubricant layer coated on said magnetic disk by substantially balancing the rate of evaporation of the lubricant material of said lubricant layer on said disk with the rate of absorption of said lubricant vapor onto said lubricant layer.

2. A magnetic disk storage apparatus according to claim 1, wherein said lubricant evaporating source is positioned in said base structure.

3. A magnetic disk storage apparatus according to claim 1, wherein said lubricant evaporating source is formed on the surface of the inner wall of said air-tight container.

4. A magnetic disk storage apparatus according to claim 1, further comprising a heating means to heat said lubricant evaporating source.

5. A magnetic disk storage apparatus according to claim 2, further comprising a heating means to heat said lubricant evaporating source.

6. A magnetic disk storage apparatus according to claim 3, further comprising a heating means to heat said lubricant evaporating source.

7. A magnetic disk storage apparatus according to claim 4, further comprising a temperature controller with a thermosensor arranged to control the temperature of said lubricant evaporating source.

8. A magnetic disk storage apparatus according to claim 1, further comprising a rotating member rotated by said drive means, and said lubricant evaporating source is formed on the surface of said rotating member.

9. A magentic disk storage apparatus according to claim 8, wherein said rotating member comprises a magnetic storage disk having a dummy surface, and said lubricant evaporating source is formed on said dummy surface.

10. A magnetic disk storage apparatus according to claim 1, wherein said lubricant layer coated on said magnetic disk comprises at least two different kinds of lubricants and said lubricant evaporating source contains a lubricant of the same type as the lubricant coated on said magnetic disk having the highest evaporation rate.

11. A magnetic disk storage apparatus according to claim 1, wherein the lubricant material of said lubricant evaporating source is coated on a porous surface.

12. A magnetic disk storage apparatus according to claim 11, wherein the main material of said porous surface is glass.

13. A magnetic disk storage appartus according to claim 12, wherein said porous surface is obtained by sintering a resin containing glass powder.

14. A magnetic disk storage apparatus according to claim 1, wherein the lubricant material of said lubricant evaporating source is the same lubricant as that coated on said magnetic storage disk.

15. A method for suppressing the consumption of a lubricant layer coated on a magnetic storage disk rotatably mounted in an air-tight enclosure of a magnetic disk storage apparatus comprising:
   arranging a lubricant evaporating source containing a lubricant material inside said air-tight enclosure;
   rotating said magnetic disk to cause a rise in the temperature inside said air-tight enclosure;

exposing the evaporating surface of said lubricant evaporating source to the hot air flow created by the rotation of said disk; and evaporating the lubricant material of said lubricant evaporating source to form a lubricant vapor inside of said air-tight enclosure so that the rate of evaporation of the lubricant material of said lubricant layer on said magnetic disk is substantially balanced with the rate of absorption of said lubricant vapor to thereby suppress the consumption of said lubricant layer coated on said magnetic disk.

* * * * *

UNITED STATES PATENT AND TRADEMARK OFFICE
CERTIFICATE OF CORRECTION

PATENT NO. : 4,626,941

DATED : Dec. 2, 1986

INVENTOR(S) : Sawada et al.

It is certified that error appears in the above-identified patent and that said Letters Patent is hereby corrected as shown below:

Front Page

[21] Appl. No., "618,078" should be --613,078--.

Col. 8
Line 54, "appartus" should be --apparatus--.

Signed and Sealed this

Seventh Day of April, 1987

Attest:

Attesting Officer

DONALD J. QUIGG

Commissioner of Patents and Trademarks